April 21, 1925.
P. D. FOUCHT
CHICKEN FEEDER
Filed July 22, 1924
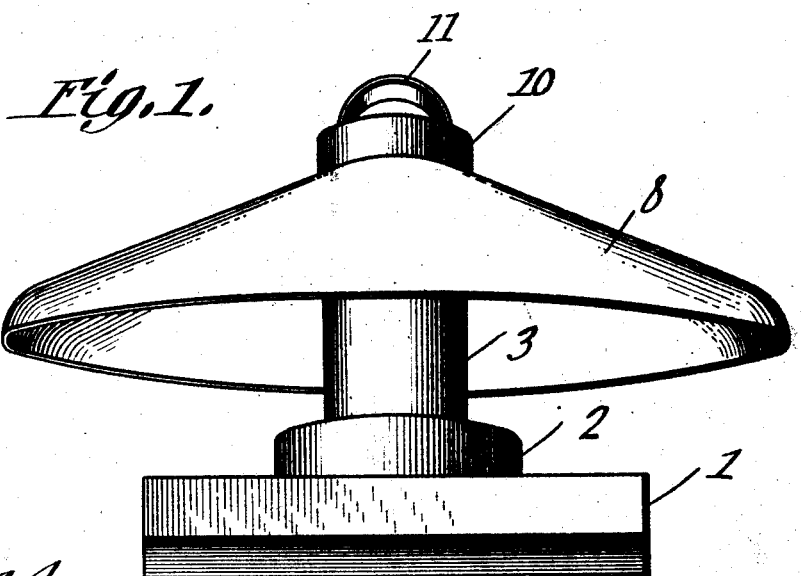
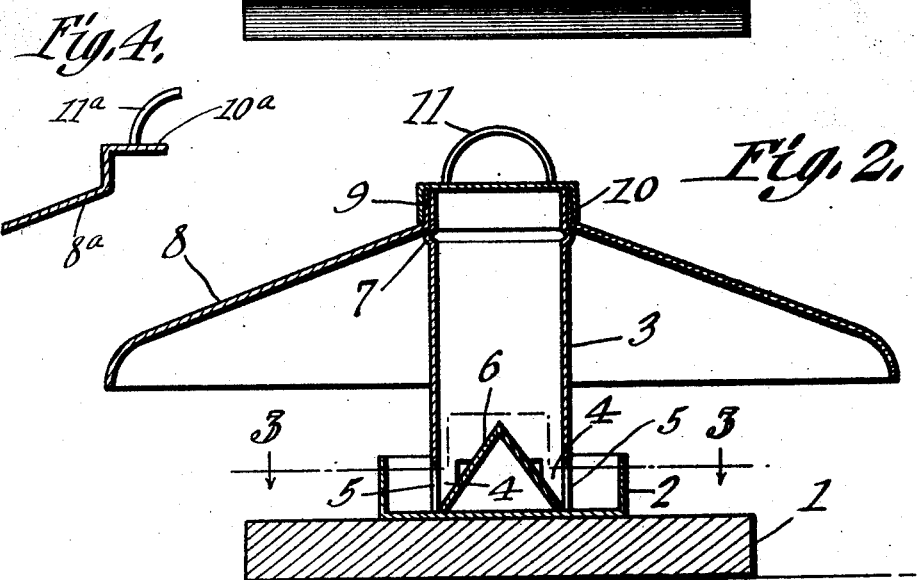
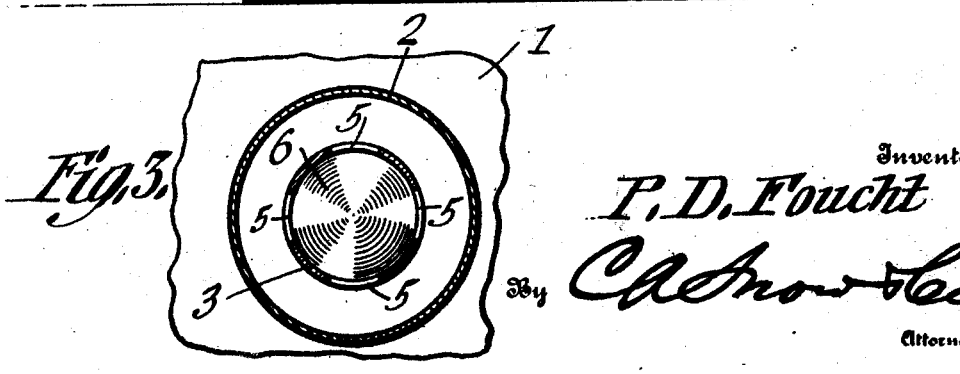
Inventor
P. D. Foucht
By C. A. Snow & Co
Attorney.

Patented Apr. 21, 1925.

1,534,375

UNITED STATES PATENT OFFICE.

PROCTOR DUTTON FOUCHT, OF TOPEKA, KANSAS.

CHICKEN FEEDER.

Application filed July 22, 1924. Serial No. 727,534.

*To all whom it may concern:*

Be it known that I, PROCTOR D. FOUCHT, a citizen of the United States, residing at Topeka, in the county of Shawnee and State of Kansas, have invented a new and useful Chicken Feeder, of which the following is a specification.

This invention relates to a feeder designed especially for baby and small chicks and the object thereof is to provide a device of this character which may be placed in the open and permit the small chicks to feed therefrom without interference by the old hens and larger chickens.

Another object is to provide a feeder of this character so constructed as to protect the small chicks in rainy and damp weather while feeding and also to keep the feed dry. Another object is to construct a feeder of this character so that the wind cannot tip it and spill the feed unless the feeder is entirely blown over.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation slightly in perspective of the feeder constituting this invention;

Fig. 2 is a vertical section thereof; and

Fig. 3 is a horizontal section taken on the line 3—3 of Fig. 2.

Fig. 4 is a detail section showing a slightly different form of hood.

In the embodiment illustrated a supporting base 1 is shown which may be in the form of a block or any suitable base to which a feed pan 2 is secured. Rising from the center of this feed pan 2 and made integral therewith is a feed hopper 3 here shown in the form of a cylinder having legs 4 with spaces 5 between them for the passage of the feed into the pan. Located in the bottom of this hopper 3 is a cone-shaped spreader 6 which directs the feed out through the openings 5 into the pan 2.

The upper end of the hopper 3 is provided with an annular rib 7 spaced inward from its upper end and which is designed to form a support for a hood 8 which has an upstanding flange 9 encircling the hopper above the rib and over which is placed a cap 10 which prevents rain from entering at this joint and protects the feed. This cap 10 is preferably equipped with a bail-shaped handle 11 to facilitate its application or removal.

The hood 8 is of a size to extend a considerable distance beyond the feeding pan 2 so as to protect the baby chicks in inclement weather when feeding and also to protect the contents of the pan from getting wet. This hood has its lower edge positioned about three and a half inches from the ground so that the baby chicks may pass freely under and the larger chickens and old hens prevented from entering. These feeders may be constructed of any desired size being preferably manufactured in three sizes to accommodate different numbers of chicks.

In Fig. 4 the hood $8^a$ and cap $10^a$ are shown pressed in one piece which greatly cheapens the manufacture.

I claim:—

1. A chick feeder comprising a feed pan, a cylindrical hopper rising therefrom and communicating therewith, a stop carried by the upper end of said hopper, a hood having an upstanding flange encircling said hopper and resting on said stop, and a cap fitting over the upper edge of the hopper and the flange of the hood.

2. A chick feeder of the class described comprising a feed pan, a hopper rising from the center thereof and communicating therewith, a cone-shaped spreader mounted in the lower end of said hopper for distributing the feed from the hopper into the pan, an annular rib on the upper end of the hopper spaced inwardly from the upper edge thereof, a hood removably mounted on the upper end of the hopper and having an upstanding flange closely fitting said hopper above said rib, and a cap fitting over the flange of the hood and the upper end of the hopper forming a water tight joint at this point.

In testimony that I claim the foregoing as my own, I have hereto affixed my signature in the presence of two witnesses.

PROCTOR DUTTON FOUCHT.

Witnesses:
  H. C. DAVIS,
  G. P. WASSWEILER.